United States Patent [19]
Insolio et al.

[11] 3,889,862
[45] June 17, 1975

[54] APPARATUS FOR CUTTING GLASS AND PLASTIC SHEET

[75] Inventors: Thomas A. Insolio, Bristol; Vincent T. Kozyrski, New Britain; Edward J. Witkoski, Burlington, all of Conn.

[73] Assignee: The Fletcher-Terry Company, Farmington, Conn.

[22] Filed: Aug. 22, 1974

[21] Appl. No.: 499,457

[52] U.S. Cl. ........................ 225/96.5; 83/8; 83/11; 83/12; 83/549; 83/564; 83/582; 83/614
[51] Int. Cl. ..................... C03b 33/02; C03b 33/10
[58] Field of Search ............ 225/96, 96.5; 83/8, 11, 83/12, 549, 582, 614, 564

[56] References Cited
UNITED STATES PATENTS

| | | | |
|---|---|---|---|
| 1,117,736 | 11/1914 | Whittemore | 225/96.5 |
| 2,146,883 | 2/1939 | Clausen | 225/96.5 |
| 3,718,268 | 2/1973 | Insolio | 225/96.5 X |
| 3,742,794 | 7/1973 | Rupprecht et al. | 83/12 |

*Primary Examiner*—Frank T. Yost
*Attorney, Agent, or Firm*—McCormick, Paulding & Huber

[57] ABSTRACT

A wall mounted sheet supporting structure includes a horizontal squaring bar, and a near vertical elongated anvil, both the bar and the anvil being joined together by a gusset plate, and the resulting structure being readily attached to a wall by means of a web shaped bracket behind the anvil, and a smaller Z-shaped bracket spaced from the anvil along the squaring bar. Two guide rods are mounted parallel to but spaced in front of the elongated anvil, and a manually movable cross-head is slidably mounted on these rods. A scoring device is provided in the head for scoring the sheet along a line over the anvil. The scoring device is resiliently mounted in the head on a rocker arm assembly which includes a cutting knife for scoring plastic, and a glass cutting wheel for scoring glass. The cutting force can be varied within two discrete ranges, a much larger force being available for cutting plastic than that provided for cutting glass.

13 Claims, 12 Drawing Figures

APPARATUS FOR CUTTING GLASS AND PLASTIC SHEET

SUMMARY OF THE INVENTION

This invention relates generally to cutting fracture sensitive sheet material, and deals more particularly with an apparatus especially suitable for scoring glass or plastic sheet. The apparatus is adapted to be mounted to a vertical wall and includes a sheet supporting structure characterized by a horizontally extending bar rigidly connected to a vertically inclined anvil by use of a generally triangular gusset. Two guide rods are mounted parallel to one another and to the anvil, and slidably receive a crosshead or carriage in which a rocker arm is pivotally mounted. A scoring device is mounted in one end of a rocker arm and includes a plastic cutting tool as well as a glass cutting tool mounted in either end of a double ended pillar post. The pillar post is reversibly mounted adjacent the one end of the rocker arm, and means is provided for biasing the end of the arm associated with the pillar post toward the anvil. One spring of said biasing means acts between the arm and a threaded adjustment screw, and another stiffer spring acts between the arm and a spindle which can be manually moved to selectively permit the stiffer spring to function only when plastic is to be cut or scored. The same adjustment screw serves to adjust the force available within two discrete force ranges associated with scoring glass and also plastic.

DETAILED DESCRIPTION

Figure 1:
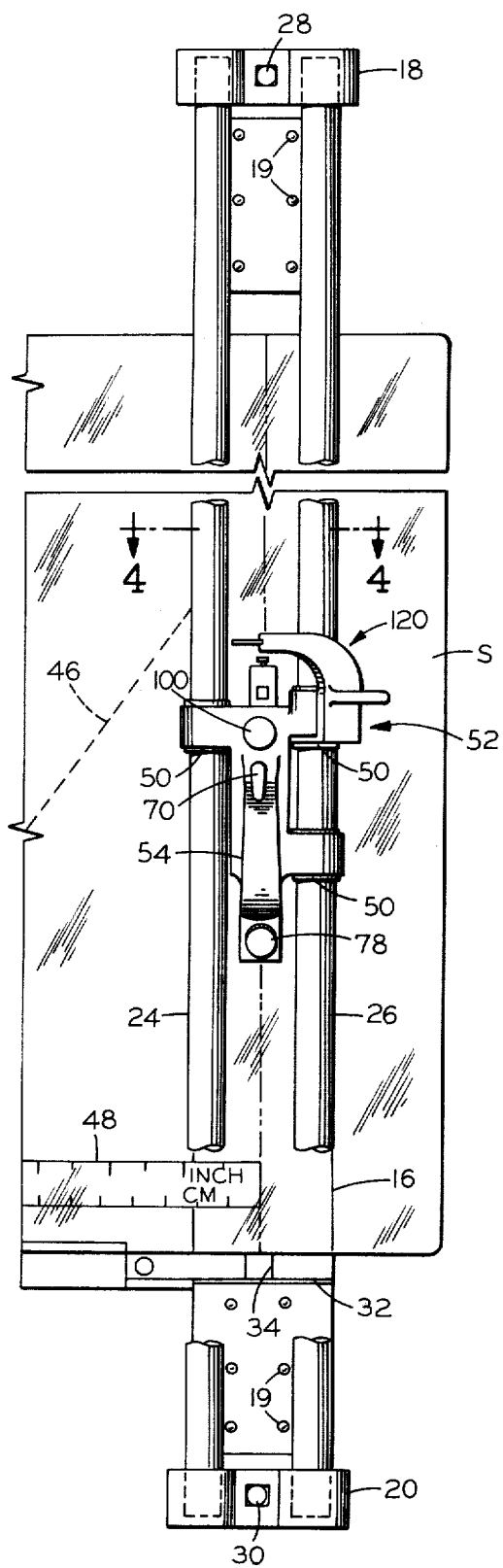
FIG. 1 is a fragmentary elevational view showing the front of an apparatus constructed in accordance with the present invention.
Figure 2:
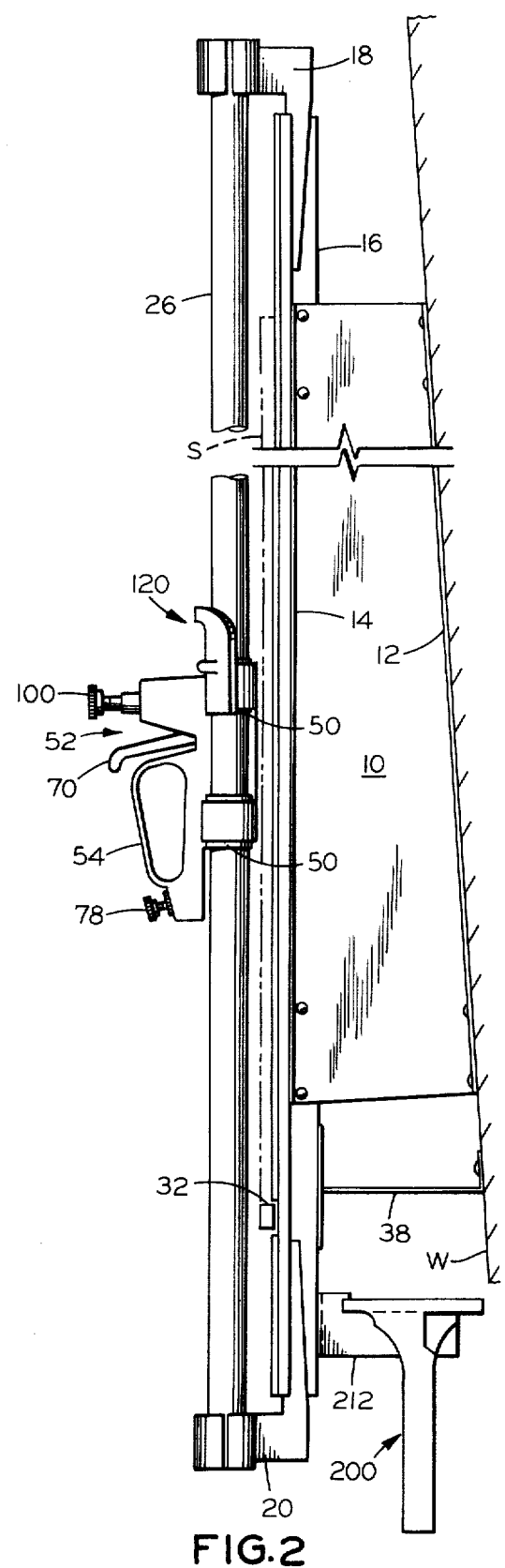
FIG. 2 is a side elevational view of the FIG. 1 apparatus, the vertical wall being also shown for reference purposes.

Turning now to the drawings in greater detail, FIG. 2 shows a vertically extending wall W which wall is depicted as inclined solely for convenience, and to better illustrate the apparatus of the present invention. A generally vertically extending web shaped bracket 10 has a rear flange 12 adapted to abut the wall W and a front flange 14, which is adapted to support the apparatus of the present invention. Such apparatus comprises an anvil 16 of extruded metal, having an upper surface which includes two inclined sides which cooperate to define an apex which defines the line depicted in FIG. 1 as the "line of score" or cut. This apex or line of cut area of the anvil 16 is provided with a slight depression best shown in FIG. 4 at 16a to avoid the contact between the anvil and one or the other of the two cutting tools associated with the cross slide or carriage to be described.

The end portions of the anvil 16 are provided with upper and lower brackets, 18 and 20 respectively, which brackets are secured to the anvil by screws 19, 19 as best shown in FIG. 1, and which brackets support the end portions of identical tubular guide rails 24 and 26 which guide rails are parallel to one another, and also parallel to the underlying anvil 16. The ends of said guide rails 24 and 26 are adapted to be clamped in the upper and lower brackets 18 and 20 and by clamping screws 28 and 30 as best shown in FIG. 1.

The anvil 16 thus comprises a portion of the support structure for the sheet material to be cut or scored, and a horizontally extending portion of such plate supporting structure includes a squaring bar 32, best shown in FIGS. 1 and 2. The bar 32 is of generally rectangular cross sectional configuration, and its upper surface provides a convenient horizontal bed for supporting the lower edge of the sheet S to be scored. It is an important feature of the present invention that the squaring bar 32 extends horizontally across the line of score defined by the anvil 16 so as to fully support the sheet S to be scored, and a notch 34 is provided in the squaring bar 32 in the area of the intended line of cut, that is in the area of the line defined by the apex of the inclined sides of the anvil 16.

Figure 3:
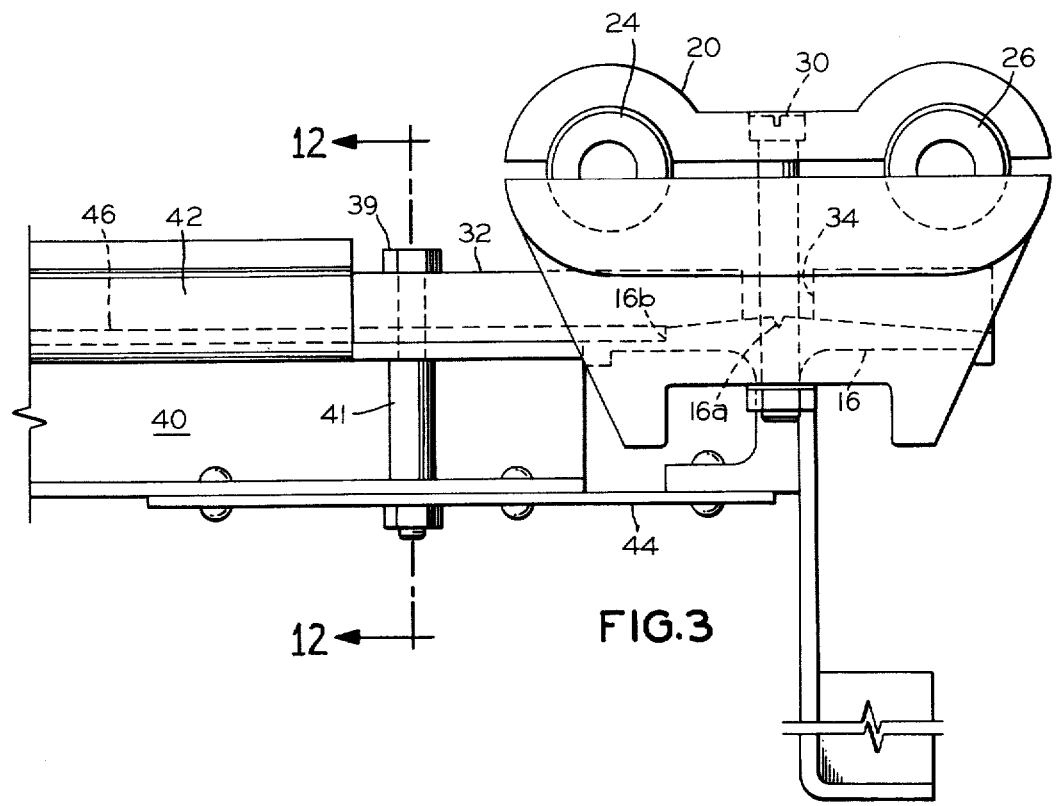
FIG. 3 is a bottom view of the FIG. 1 apparatus.
Figure 12:
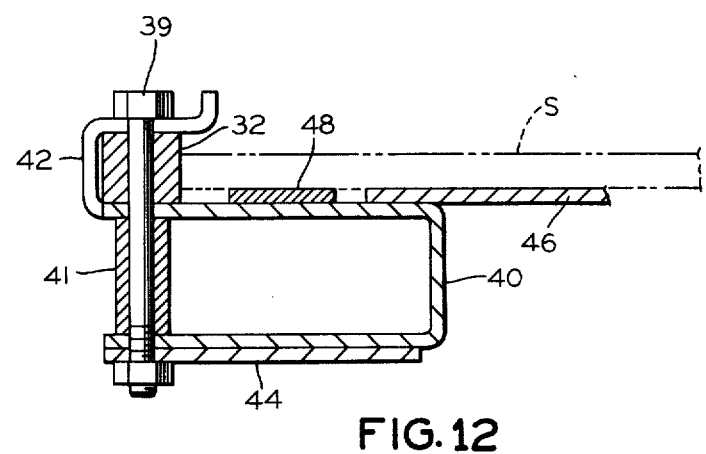
FIG. 12 is a sectional view taken on the line 12—12 of FIG. 3.

As best shown in FIGS. 3 and 12 the squaring bar 32 is bolted 39 to an underlying S-shaped support 40, which support includes a horizontally extanding front flange 42 for conveniently supporting the lower edge of the squaring bar 32, and which support 40 also includes a generally vertically extending wall which supports a scale 48, and which wall is also connected to a gusset plate 46. The anvil 16 is also connected to the rear wall of support 40 through a connecting plate 44, as best shown in FIGS. 3 and 12.

Still with reference to the sheet support structure, a generally T-shaped bracket 38, best shown in FIG. 2, is provided between the wall W and the horizontally extending member 40 in spaced horizontal relation to the bracket 10 for supporting the apparatus from the wall. The gusset plate 46 is triangular in shape and joins these supports 10 and 38. More particularly, the generally triangularly shaped gusset plate 46 includes a generally vertically extending edge which is adapted to be secured to a leg of the anvil 16, and this leg of said anvil includes a notched portion best shown in FIG. 3 at 16b is provided for this purpose. The horizontally extending edge of the triangular gusset plate 46 is secured to the front wall of the horizontally extending member 40 as best shown in FIG. 12. The other edge of this triangular gusset plate 46 is shown in FIG. 1 where it will be seen that the sheet S is or may be supported in part by such plate.

The anvil 16 extends upwardly from the lower bracket 20, below the squaring bar 32, in an inclined vertical direction to the upper bracket 18, providing sufficient space to accommodate sheets of approximately 4 to 5 feet wide. The guide rails or rods 24 and 26 are mounted in spaced parallel relationship to the anvil 16 with the end portions of each clamped in the upper and the lower brackets 18 and 20 respectively. As best shown in FIGS. 2 and 3 each of these brackets 18 and 20 comprise a base portion which is adapted to fit behind the generally T-shaped anvil 16 to be secured to said anvil by the screws 19, 19 best shown in FIG. 1, and to have a raised portion which extends upwardly providing a portion in front of the anvil 16 to accommodate the cylindrical guide rails 24 and 26.

A crosshead or carriage is slidably supported on these guide rails for generally vertical movement and carries a tool so that the operator can manually move the carriage downwardly to score the glass or plastic sheet placed on the squaring bar and resting against the anvil 16 in an inclined plane of approximately 4 degrees with respect to the vertical. The back plate or triangular gusset 46 also serves to aid in supporting the plastic sheet S during the scoring operation.

Figure 8:
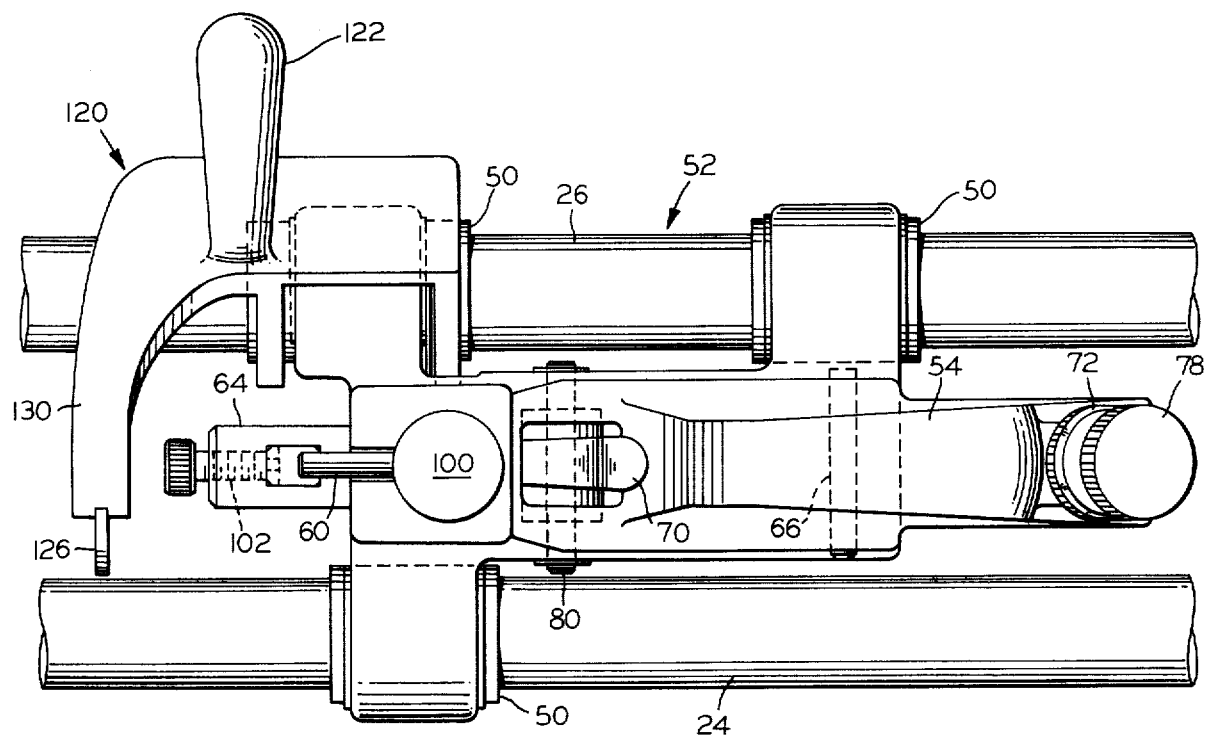
FIG. 8 is a detailed plan view of the crosshead shown in FIG. 1 but drawn into a slightly larger scale.

Turning next to a more detailed description of the cross head 52, FIG. 8 shows three slide bearings 50, 50 provided in a cast member, one of said bearings 50 being slidably received on the guide rail 24 and the other two slide bearings being aligned with one another and slidably received on the other of said guide rails 26. A glass breaking device 120 is pivotally carried on one of these slide bearings for movement about the axis of the guide rail 26 for a purpose to be described in greater detail hereinbelow.

Figure 4:
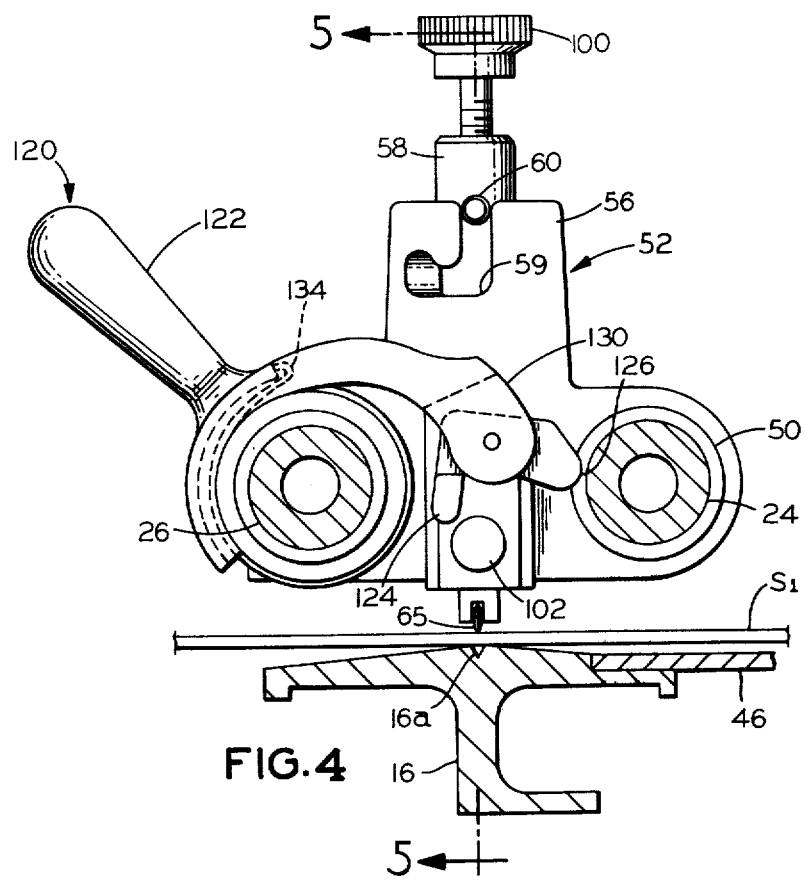
FIG. 4 is a sectional view taken generally on the line 4—4 of FIG. 1.
Figure 5:
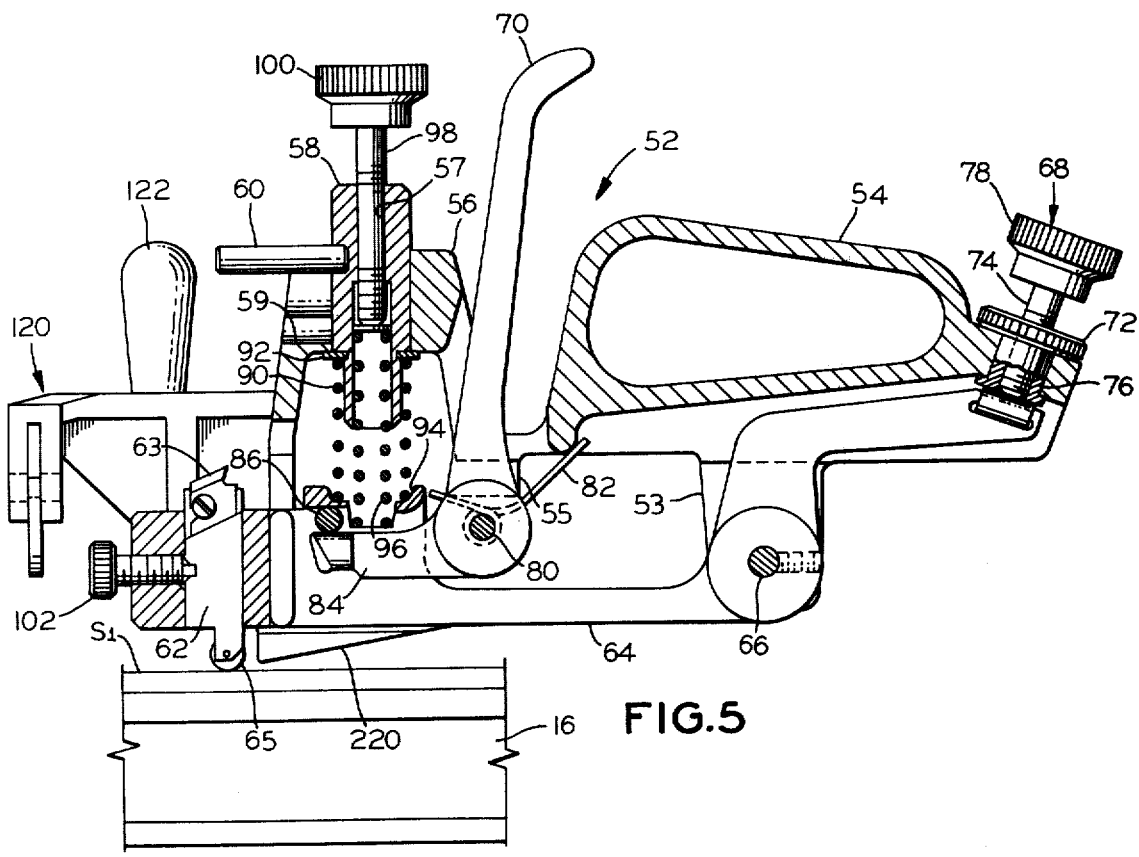
FIG. 5 is a vertical sectional view taken generally on the line 5—5 of FIG. 4.
Figure 6:
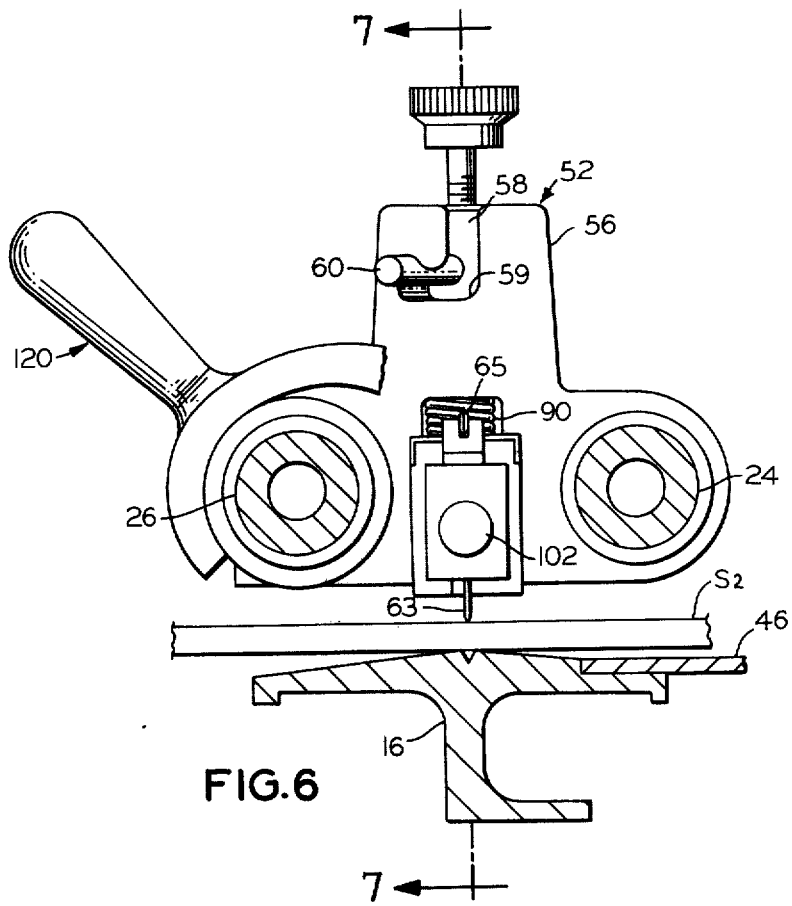
FIG. 6 is a view similar to FIG. 4 but showing the pillar post within the crosshead in an alternative position.

FIG. 4 shows two of the slide bearings 50, 50 for supporting the crosshead 52 on the parallel guide rails 24 and 26. As best shown in FIG. 5 the crosshead 52 includes an integrally molded handle portion 54 and a raised boss 56 in which a stem 58 is slidably received with a bayonet 60 being connected to the stem 58 and carried in a slot 59 best shown in FIGS. 4 and 6 so that the stem can be positioned as shown in FIG. 4 when glass S1 is to be scored or can be moved to the down position shown in FIG. 6 when a plastic sheet S2 is to be scored or cut.

The scoring device or tool preferably comprises a reversible pillar post 62 removably held in the free end of a rocker arm 64, which rocker arm is pivotally supported, by a pin 66 in the cast cross head, for limited movement in the cross head one limit position being determined by the stop screw assembly 68, and the other limit position by a clockwise moment exerted on the rocker arm 64 either by the sheet being scored, or by a lever 70 provided for raising the rocker arm 64 to an inactive position (not shown) which will permit the crosshead 52 to be moved along the guide rails without actually scoring or touching a plastic sheet positioned on the horizontal squaring bar as depicted in FIGS. 1 and 2. More particularly, the stop means 68 comprises a knurled nut 72 which is threadably received in a screw 74, and the screw is also threadably received in a captured nut 76 held in a portion of the crosshead so as to permit turning of the knob 78 and thereby varying the down limit position for the rocker arm and of the pillar post 62. This down limit adjustment 68 is provided merely to prevent engagement between one or the other of the scoring means defined in the pillar post 62 and the anvil 16 when no sheet is positioned for cutting. Thus the cutters at either end of the pillar post are prevented from contacting the anvil 16.

The pin 66, provided for so supporting the arm 64, is mounted in a depending post portion 53 of the cast crosshead immediately below the handle 54. The manually operable lever 70 is also pivotally mounted, a pin 80 being provided in a second depending post portion 55 of the cast crosshead. A spring 82 is provided for urging the lever 70 in a clockwise direction, as viewed in FIGS. 5 and 7, so that a projecting arm 84 on lever 70 is adapted to contact a pin 86 provided for this purpose in the cast cross head to permit the rocker arm 64 to be raised manually as a result of pulling lever 70 in a clockwise direction, a convenient motion for the operator when his hand is positioned on the handle 54 immediately adjacent the lever 70.

Figure 7:
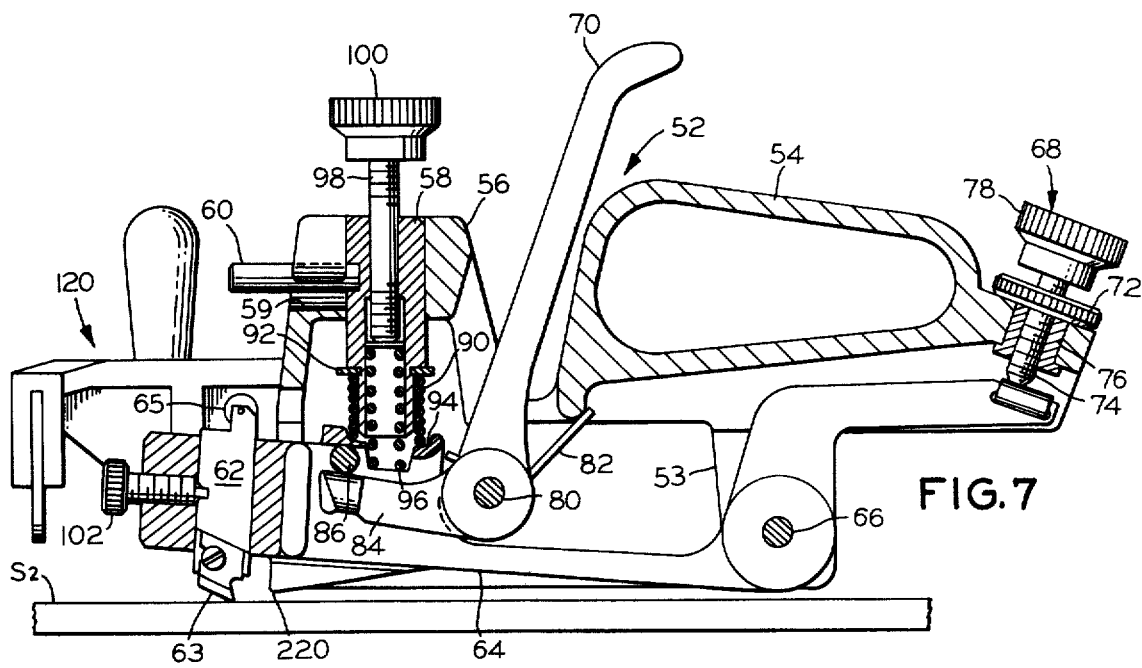
FIG. 7 is a vertical sectional view taken generally on the line 7—7 of FIG. 6.

Means is provided for normally biasing the rocker arm 64 and the cutting tool in the pillar post 62 downwardly, in a counterclockwise direction as viewed in FIGS. 5 and 7, and said biasing means preferably comprising a pair of springs one stiffer than the other, the stiffer spring being so arranged as to be used in scoring or cutting plastic, and such stiffer spring being selectively rendered substantially ineffective when glass is to be scored. The stiffer spring is indicated at 90, and has an upper end which acts upon a downwardly facing flange 92 provided for this purpose in the stem 58, which stem is slidably received in the boss 56 of the cast cross head. The lower end of the stiffer spring 90 engages a seat 94 provided for this purpose in the rocker arm 64. The bayonet 60 is slidably received in a serpentine slot 59, defined for this purpose in the boss 58, so that manual movement of the bayonet 60 between the positions shown for it in FIGS. 4 and 6 respectively will permit the user to manually render the spring ineffective or effective. The spring 90 is rendered relatively ineffective in FIG. 5, but in its compressed position (FIG. 7) this exerts a relatively large biasing force on the rocker arm 64 in a counterclockwise direction and thereby provides the necessary force on the plastic cutter 63 to permit said cutter to score the plastic sheet S2 to the desired depth. On the other hand, when bayonet 60 is positioned as shown in FIG. 5, the spring 90 is allowed to expand into substantially its undeformed condition with the result that a smaller diameter, and weaker inner spring 96 exerts the downward force on the seat 94 in rocker arm 64. As so configured the glass scoring wheel 61 is adapted to exert a significantly reduced force on the glass sheet S1 to be scored.

The lighter spring 96 acts between the lower end of a threaded adjustment screw 98 and the seat 94, and is threadably received in an opening 57 provided for this purpose in the stem 58. A knob 100 permits the user to vary the force of spring 96 on the rocker arm 64 in order to provide the requisite force for scoring a glass sheet S1 in spite of variations in its thickness. It will of course be apparent from FIG. 7 that even when the stiffer spring 90 is exerting the primary force on rocker arm 64 to provide the requisite force for scoring plastic sheet S2, that the lighter spring 96 also acts on the rocker arm 64 to add to the force of the stiffer spring 90. As a result of this combination of both springs 90 and 96 acting on the rocker arm 64, adjustment screw 98 can always be utilized to vary at least the force exerted by the lighter spring 96, which force will have been considerably increased as a result of moving the stem 58 downwardly to the position shown for it in FIG. 7. Thus, the knob 100 can be used to adjust the force exerted by the plastic cutter 63 as well as the force exerted by the glass cutter 62 on the plastic and glass sheet S2 and S1 respectively.

Turning next to a more detailed description of the pillar post 62, an opening is provided for receiving this tool adjacent the free end of rocker arm 64, and a retaining screw 102 is threadably mounted in an opening of rocker arm 64 so that the inner end of screw 102 is adapted to be received in a slot provided for this purpose in the pillar post 62. The pillar post thus is adapted to be secured in either its FIG. 5 position or to be reversed and secured in its FIG. 7 position for scoring either glass S1 or plastic S2 respectively.

In order to facilitate breaking as well as scoring glass, this apparatus includes a glass breaking device 120 carried at the upper right hand portion of the crosshead 52 so that once the operator has drawn the crosshead downwardly to score the sheet S1 from the upper edge of the lower edge thereof, then he need only raise lever 122 to cause spaced lands 124 and 126, defined on a pivotally mounted breaking bar, to engage spaced areas of the scored glass sheet to cause the sheet to break and a crack to run upwardly across the glass sheet in a conventional fashion. The lands 124 and 126 are defined on the breaker bar 128 which bar is in turn pivotally mounted on a pin in the gree end of the crank arm 130, which arm 130 is integrally connected to the manually operated lever 122. A spring 134 serves to hold the lever 122 in the position shown for it in FIG. 4, and the force of this spring must be overcome by the operator in breaking the glass sheet with the device 120.

Figure 9:
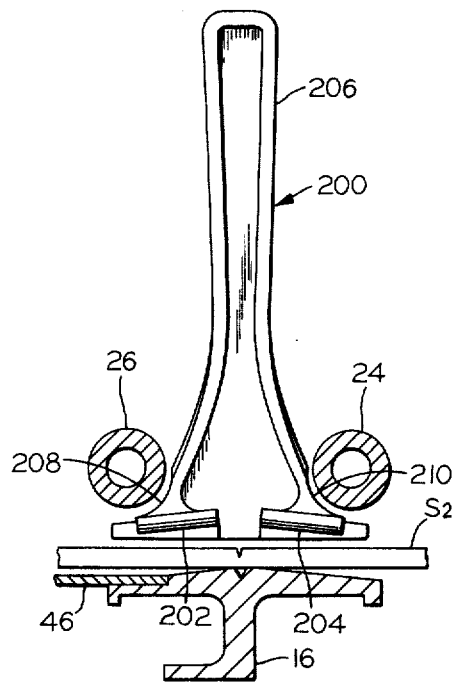
FIG. 9 is a generally horizontal sectional view taken through the guide rails, in a manner similar to the FIG. 4 and FIG. 6 views, but with the crosshead deleted, and with a plastic bending tool inserted between the guide rails.
Figure 10:
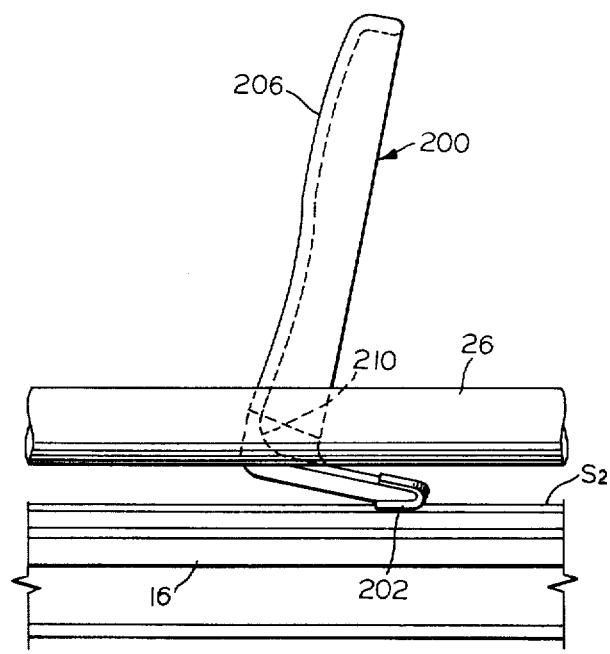
FIG. 10 is a side elevational view of the tool depicted in FIG. 9.
Figure 11:
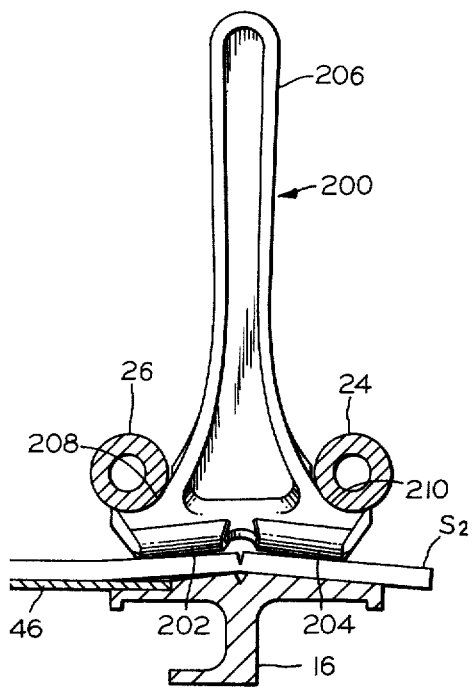
FIG. 11 is a view generally similar to FIG. 9 but showing the plastic deflected as a result of applying a manual force to the handle portion of this tool.

FIGS. 9, 10 and 11 illustrate a tool 200 for breaking the plastic sheet S2 after it has been scored by the plastic scoring tool or knife 63 in one end of the pillar post 62 of FIG. 7. This breaking or fracturing tool 200 has a generally L-shaped configuration as best shown in FIG. 10 with spaced lands 202 and 204 defined on the lower leg of the L for engaging spaced areas on each side of the line of cut, or score made by the knife 63. The upstanding leg of the L-shaped tool 200 serves as a manually operated lever or handle 206 to permit the user, or operator, to pivot the tool 200 at successive locations along the anvil 16 to develop the socre into a deeper fissure as disclosed in my prior copending application entitled PLASTIC CUTTING METHOD AND APPARATUS filed Jan. 30, 1974 under Ser. No. 437,982. As taught therein the scoring and breaking of plastic sheet can be greatly facilitated by using an anvil with sloped sides to allow approximately 7° bending to either side of the score line. This procedure allows deepening the fissure created by the scoring knive to the extent that the plastic can then be broken out in much the same manner as a sheet of scored glass.

As a result of its L-shaped configuration the tool too can be inserted between the rails 24 and 26 (at least when rotated 90° from the position shown in FIG. 9) and the user then can pivot the upstanding lever 206, generally clockwise as seen in FIG. 10, so that the generally concave cutouts 208 and 210 of the tool engage the rails 26 and 24, as best shown in FIG. 11. The lands 202 and 204 are thereby urged downwardly, at some mechanical advantage dependent on the relative lengths of the legs of the L-shaped tool, causing the score line to deepen in a fissure such that the plastic sheet S2 can be readily broken as taught in the above-mentioned copending patent application. It will of course be apparent that this manually operable tool 200 cannot be conveniently kept between the rails 24 and 26, especially when glass or plastic is being scored, and therefor, a convenient storage rack 212 is provided behind the lower bracket 20 for receiving this tool when it is not in use.

FIGS. 5 and 7 show respectively, the configuration of the rocker arm and pillar post in position for scoring plastic and glass sheet material. These views also show a small ramp 220 mounted to the underside of the rocker arm, and when the scoring device is so used this ramp clears the upper surface of the material by a slight amount. However, prior to the time when the scoring tool contacts the sheet this ramp serves to raise the rocker arm to a proper height such that the tool will not chip or otherwise damage the sheet. The ramp 220 engages the sheet to lift the arm slightly just prior to contact being made between the tool and the sheet. Once the scoring has begun, the ramp clears the sheet as shown.

We claim:

1. Apparatus for scoring fracture sensitive sheet material comprising:
    a. support means for the sheet including a horizontally extending squaring bar adapted to engage a lower edge of the sheet to be scored,
    b. said sheet support means further including an elongated anvil which is inclined slightly to the vertical and which cooperates with said squaring bar to support a planar sheet in a plane slightly inclined with respect to the vertical,
    c. two parallel guide rails supported in spaced parallel relation to said anvil and extending from a position below said squaring bar gently upwardly and parallel said anvil,
    d. a cross head slidably mounted on said guide rails and having a handle for manually moving the head along said rails,
    e. a rocker arm pivotally mounted in said cross head intermediate its ends,
    f. scoring means adjacent one end of said rocker arm, said scoring means being received in an opening in said arm and means being provided to retain said scoring means in said rocker arm opening,
    g. biasing means for urging said one end of said rocker arm and said scoring means toward said anvil,
    h. stop means associated with the other end of said rocker arm to limit the movement of said scoring means toward said anvil, and
    i. a lever adjacent said handle and pivotally movable in said head generally toward said handle in response to a manual squeezing action, said lever including a projecting portion engageable with said arm to permit moving said scoring means away from said anvil when manually moving said head in a return direction opposite a scoring direction.

2. The apparatus of claim 1 wherein said sheet scoring means comprises a pillar post having a cross sectional shape corresponding to that of said rocker arm opening, said pillar post have a side opening defined intermediate its ends, and said means for retaining said pillar post in said opening comprising a screw threadably received in said one end of said rocker arm, and said retaining screw having an inner end adapted to be received in said pillar post side opening.

3. The apparatus of claim 2 wherein said pillar post has a glass scoring wheel rotatably mounted in one end and a fracture sensitive plastic scoring knife mounted in its other end, said pillar post being mountable in either one of two positions depending upon whether glass or plastic is to be scored.

4. The apparatus of claim 1 wherein said biasing means comprises at least two compression springs one end of each spring acts against said rocker arm, one of said springs being stiffer than the other, and means in said cross head for selectively varying the displacement of said stiffer spring to selectively render said stiffer spring effective or ineffective, said other spring always acting between said cross head and said rocker arm and said stiffer spring selectively acting between said rocker arm and said cross arm through said means in said cross head.

5. The apparatus of claim 3 wherein said biasing means comprises at least two compression springs one end of each spring acts against said rocker arm, one of said springs being stiffer than the other, and means in said cross head for selectively varying the displacement of said stiffer spring to selectively render said stiffer spring effective or ineffective, said other spring always acting between said cross head and said rocker arm and said stiffer spring selectively acting between said rocker arm and said cross arm through said means in said cross head.

6. The apparatus of claim 4 wherein said means in said cross head for varying said spring force comprises an internally threaded stem slidably received in an opening defined in said cross head, said stiffer spring engaging an annular flange on said sleeve, and a projecting bayonet on said sleeve engageable with one end of a bayonet slot defined in said cross head, and a spring force adjusting screw threadably received in said sleeve and having its inner end engaging said other spring.

7. The apparatus fo claim 5 wherein said means in said cross head for varying said spring force comprises an internally threaded stem slidably received in an opening defined in said cross head, said stiffer spring engaging an annular flange on said sleeve, and a projecting bayonet on said sleeve engageable with one end of a bayonet slit defined in said cross head, and a spring force adjusting screw threadably received in said sleeve and having its inner end engaging said other spring.

8. The apparatus of claim 1 further including means for fracturing the scored sheet, said anvil having a cross sectional shape defined by sloping sides which intersect to define an apex at the line of score, and said sheet fracturing means comprising a device with spaced lands for engaging the sheet at laterally spaced locations on either side of said score line.

9. The apparatus of claim 8 wherein said sheet fracturing device comprises a generally L-shaped tool one end of which is adapted for insertion between said guide rails and the scored sheet and having said spaced lands defined thereon, the other end of said L-shaped tool serving as a manual handle to permit the user to operate the tool in a lever-like action at successive locations along said anvil to develop a fissure at said score line in order to facilitate the final fracturing of a plastic sheet.

10. The apparatus of claim 8 wherein said sheet fracturing device comprises a crank arm which is pivotally mounted to one of said guide rails and which has a handle portion for moving said crank arm from an inactive position toward an active position, biasing means for urging said crank arm toward said inactive position, and said spaced lands being defined on a free end portion of said crank arm located between said guide rails for so engaging said sheet.

11. The apparatus of claim 1 wherein said cross head includes three slide bearings, one slidably received on one of said two guide rails, and the other two bearings being slidably received on the other of said two guide rails, and said handle being integrally defined by a casting in which said slide bearings are mounted, said handle being located between said guide rail receiving bearings.

12. The apparatus of claim 11 wherein said casting defining said cross head also defines a raised boss in which said biasing means is provided, said biasing means comprising two coaxially arranged coil compression springs, one of said springs being stiffer than the other, and means in said cross head boss for selectively varying the displacement of said stiffer spring to render it either effective or ineffective.

13. The apparatus of claim 12 wherein said means in said cross head boss for varying said biasing force of said coaxially arranged springs comprises an internally threaded stem slidably received in an opening defined in said cross head, said stiffer spring engaging an annular flange on said sleeve, and a projecting bayonet on said sleeve engageable with one end of a bayonet slot defined in said cross head, and a spring force adjusting screw threadably received in said sleeve and having its inner end engaging said other spring.

* * * * *